(12) United States Patent
Barnes et al.

(10) Patent No.: US 7,520,677 B2
(45) Date of Patent: Apr. 21, 2009

(54) NON-PHYSICAL CONTACT VISUAL FAULT LOCATOR COUPLER

(75) Inventors: Brandon Andrew Barnes, Fort Worth, TX (US); Bradley Scott Billman, Denton, TX (US); David Wayne Meek, Fort Worth, TX (US); Scott Eric Semmler, Roanoke, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/652,734

(22) Filed: Jan. 12, 2007

(65) Prior Publication Data
US 2008/0170825 A1    Jul. 17, 2008

(51) Int. Cl.
G02B 6/36    (2006.01)
(52) U.S. Cl. .............................. 385/72; 385/60; 385/88
(58) Field of Classification Search ........................ None
See application file for complete search history.

(56) References Cited

U.S. PATENT DOCUMENTS

| | | | | |
|---|---|---|---|---|
| 4,030,809 | A |   | 6/1977  | Onishi et al. ............... 350/96 C |
| 4,257,674 | A |   | 3/1981  | Griffin et al. ............. 350/96.21 |
| 4,444,461 | A | * | 4/1984  | Wey et al. ...................... 385/72 |
| 4,707,068 | A |   | 11/1987 | Moulin ..................... 350/96.21 |
| 4,755,018 | A |   | 7/1988  | Heng et al. ............... 350/96.21 |
| 4,877,303 | A |   | 10/1989 | Caldwell et al. .......... 350/96.21 |
| 4,923,274 | A |   | 5/1990  | Dean ........................ 350/96.21 |
| 4,964,688 | A |   | 10/1990 | Caldwell et al. ........... 350/96.2 |
| 5,040,867 | A |   | 8/1991  | deJong et al. .................. 385/60 |
| 5,066,094 | A | * | 11/1991 | Takahashi ..................... 385/73 |
| 5,109,468 | A | * | 4/1992  | Tamulevich et al. ......... 385/140 |
| 5,218,657 | A |   | 6/1993  | Tokudome et al. ............ 385/70 |
| 5,261,020 | A |   | 11/1993 | deJong et al. ................. 385/76 |
| 5,267,342 | A |   | 11/1993 | Takahashi et al. ........... 385/140 |
| 5,394,496 | A |   | 2/1995  | Caldwell et al. .............. 385/70 |
| 5,642,450 | A |   | 6/1997  | Oda ............................. 385/60 |
| 5,887,099 | A |   | 3/1999  | Csipkes et al. ................ 385/56 |
| 6,102,581 | A | * | 8/2000  | Deveau et al. ................ 385/56 |

(Continued)

FOREIGN PATENT DOCUMENTS

EP    0056192    7/1982

(Continued)

OTHER PUBLICATIONS

John W. Peters, "Field Measurement of Fiber Optic Systems," Proceedings of the National Communications Forum, National Engineering Consortium Inc., Oak Brook, Illinois, US, vol. 42, No. 1, Sep. 30, 1988, pp. 223-225, XP000053193.

(Continued)

*Primary Examiner*—Sung H Pak
*Assistant Examiner*—Mike Stahl (57) ABSTRACT

The present invention provides a non-physical contact (non-PC) visual fault locator (VFL) coupler that functions with fewer components and reduces handling, and without ferrule-to-ferrule contact, thereby reducing endface wear degradation and other problems. Specifically, the non-PC VFL coupler incorporates an alignment sleeve retainer that includes a connector stop, such that, when a field-installable fiber optic connector engages the alignment sleeve retainer of the non-PC VFL coupler, the endfaces of the ferrules of the non-PC VFL coupler and the field-installable fiber optic connector do not physically contact one another. Both 1.25 mm and 2.5 mm versions are contemplated, among others.

19 Claims, 8 Drawing Sheets

U.S. PATENT DOCUMENTS

| | | | |
|---|---|---|---|
| 6,173,097 B1 | 1/2001 | Throckmorton et al. | 385/59 |
| 6,379,054 B2 | 4/2002 | Throckmorton et al. | 385/66 |
| 6,439,780 B1 | 8/2002 | Mudd et al. | 385/83 |
| 6,442,318 B1 | 8/2002 | Goldman | 385/114 |
| 6,816,661 B1 | 11/2004 | Barnes et al. | 385/134 |
| 6,931,193 B2 | 8/2005 | Barnes et al. | 385/134 |
| 7,088,880 B1* | 8/2006 | Gershman | 385/12 |
| 2004/0161204 A1 | 8/2004 | Zimmel et al. | 385/73 |
| 2005/0220419 A1 | 10/2005 | Stevens | 385/55 |
| 2006/0078264 A1 | 4/2006 | Lauzier et al. | 385/134 |
| 2007/0031101 A1* | 2/2007 | Kline et al. | 385/135 |
| 2007/0172179 A1* | 7/2007 | Billman et al. | 385/99 |

FOREIGN PATENT DOCUMENTS

| | | |
|---|---|---|
| EP | 0246166 | 11/1987 |
| EP | 0306243 | 3/1989 |
| EP | 0860722 | 8/1998 |
| FR | 2517836 | 6/1983 |
| JP | 57-161816 | 10/1982 |
| JP | 2006-39085 | 2/2006 |
| JP | 2006-259220 | 9/2006 |

OTHER PUBLICATIONS

H. Pohlers, et al., "Untersuchungen an LWL-Steckverbindungen," Nachrichtentechnik Elektronik, veb Verlag Technik, Berlin, DE, vol. 39, No. 7, Jan. 1, 1989, pp. 246-249, XP000053346.

Patent Cooperation Treaty, International Search Report for International Application No. PCT/US2008/000094, Jun. 24, 2008, 4 pages.

* cited by examiner

NON-PHYSICAL CONTACT VISUAL FAULT LOCATOR COUPLER

BACKGROUND OF THE INVENTION

1. Field of the Invention

The present invention relates generally to enabling equipment associated with field-installable fiber optic connectors and a related optical continuity test system (CTS). More specifically, the present invention relates to a non-physical contact (non-PC) visual fault locator (VFL) coupler and an associated method of use. The non-PC VFL coupler of the present invention allows an optical CTS to function with fewer components and reduced handling, and without ferrule-to-ferrule contact, thereby reducing endface wear degradation and other problems.

2. Technical Background of the Invention

Current installation techniques associated with field-installable fiber optic connectors involve the verification of optical continuity using an optical CTS, as described in detail in U.S. Pat. No. 6,816,661 (Barnes, et al.), which is incorporated in-full by reference herein. Such techniques use a visual laser source, one or more jumpers coupled to the visual laser source, and one or more couplers coupled to the one or more jumpers to verify optical fiber contact in a mechanical splice joint. These couplers are generally connector-type specific (e.g., single fiber 1.25 mm and 2.5 mm or multi-fiber ferrules, etc.). There are, however, commercially-available universal couplers that adapt 2.5 mm VFL ports to 1.25 mm connectors, for example. For the most part, these techniques work well, but are somewhat cumbersome due to the number of components involved and the need to periodically replace the worn out jumpers. To complete a connector termination using an existing optical CTS, a VFL is attached to a jumper, the jumper is then attached to a coupler, and the coupler then accepts a field-installable fiber optic connector. An installation tool is used to accept/align/secure the field and factory optical fibers in the mechanical splice joint. The existing optical CTS requires that the ferrule endfaces remain in physical contact (PC) for proper operation. This ferrule endface PC requirement dictates that the coupler holds the ferrule endfaces together, in a robust geometry, and makes endface wear degradation an issue.

Specifically, Barnes et al. discloses methods for validating the continuity of one or more optical fibers upon which a fiber optic connector is mounted. Generally, the fiber optic connector is mounted upon an optical field fiber by actuating a cam mechanism to secure the optical field fiber in a position relative to an optical fiber stub. If subsequent testing indicates that the continuity of the optical field fiber and the optical fiber stub is unacceptable, the cam mechanism may be deactuated, the optical field fiber may be repositioned and the cam mechanism may be reactuated without having to remove and replace the fiber optic connector. In order to determine if continuity has been established between the optical field fibers and respective optical fiber stubs, a method is also disclosed that introduces light into at least one of each pair of optical field fibers and optical fiber stubs and that only secures the position of each optical field fiber relative to the respective optical fiber stub once the glow associated with each pair of optical field fibers and optical fiber stubs appreciably dissipates, which dissipation indicates the establishment of acceptable continuity.

Thus, as of yet, there is an unresolved need for a non-PC VFL coupler that functions with fewer components and reduces handling, and without ferrule-to-ferrule contact, thereby reducing endface wear degradation and other problems.

SUMMARY OF THE INVENTION

In various embodiments, the present invention provides a non-PC VFL coupler that functions with fewer components and reduces handling, and without ferrule-to-ferrule contact, thereby reducing endface wear degradation and other problems. Specifically, the non-PC VFL coupler incorporates an alignment sleeve retainer that includes a connector stop, such that, when a field-installable fiber optic connector engages the alignment sleeve retainer of the non-PC VFL coupler, the endfaces of the ferrules of the non-PC VFL coupler and the field-installable fiber optic connector do not physically contact one another. Both 1.25 mm and 2.5 mm versions are contemplated, among others.

In one embodiment, the present invention provides a non-physical contact visual fault locator coupler for coupling a light source to a fiber optic connector under test without physical contact of the associated ferrules, including: an alignment sleeve retainer having an interior surface defining a bore therethrough, a light source side, and a fiber optic connector side, the fiber optic connector side of the alignment sleeve retainer including a connector stop; and a first ferrule disposed partially within the light source side of the bore of the alignment sleeve retainer; wherein the fiber optic connector side of the alignment sleeve retainer is configured to selectively engage and retain a fiber optic connector including a second ferrule, the second ferrule disposed partially within the fiber optic connector side of the bore of the alignment sleeve retainer; and wherein the connector stop of the alignment sleeve retainer is configured to prevent an endface of the second ferrule disposed partially within the fiber optic connector side of the bore of the alignment sleeve retainer from making physical contact with an endface of the first ferrule disposed partially within the light source side of the bore of the alignment sleeve retainer.

Optionally, the non-physical contact visual fault locator coupler also includes an alignment sleeve disposed at least partially within the bore of the alignment sleeve retainer and about the portions of the first and second ferrules disposed therein. The non-physical contact visual fault locator coupler also includes a ferrule holder having an interior surface defining a bore therethrough, a light source side, and a fiber optic connector side, the fiber optic connector side of the alignment ferrule holder configured to engage and retain the light source side of the alignment sleeve retainer, the first ferrule disposed partially within the fiber optic connector side of the bore of the ferrule holder. The non-physical contact visual fault locator coupler further includes a third ferrule disposed partially within the light source side of the bore of the ferrule holder. The light source side of the ferrule holder is configured to selectively engage and retain one or more of a jumper and a port of a visual fault locator. The non-physical contact visual fault locator coupler still further includes a bayonet disposed about the alignment sleeve retainer and the ferrule holder. Finally, the connector stop of the alignment sleeve retainer is configured to prevent the endface of the second ferrule disposed partially within the fiber optic connector side of the bore of the alignment sleeve retainer from making physical contact with the endface of the first ferrule disposed partially within the light source side of the bore of the alignment sleeve retainer and maintaining a separation distance of between about 1 µm and about 500 µm.

In another embodiment, the present invention provides a non-physical contact visual fault locator coupler for coupling a light source to a fiber optic connector under test without physical contact of the associated ferrules, including: an alignment sleeve retainer having an interior surface defining a bore therethrough, a light source side, and a fiber optic connector side; a first flat ferrule disposed partially within the light source side of the bore of the alignment sleeve retainer; and a ferrule holder having an interior surface defining a bore therethrough, a light source side, and a fiber optic connector side, the fiber optic connector side of the alignment ferrule holder configured to engage and retain the light source side of the alignment sleeve retainer, the first ferrule disposed partially within the fiber optic connector side of the bore of the ferrule holder; wherein the fiber optic connector side of the alignment sleeve retainer is configured to selectively engage and retain a fiber optic connector comprising a second angled physical contact (APC) ferrule, the second ferrule disposed within the fiber optic connector side of the bore of the alignment sleeve retainer; and wherein a portion of the APC ferrule endface contacts a portion of the UPC ferrule to generate an air gap at the ferrule-to-ferrule interface. The air gap prevents fiber-to-fiber contact and is accounted for in the setup of the VFL. Optionally, the non-physical contact visual fault locator coupler includes an alignment sleeve disposed at least partially within the bore of the alignment sleeve retainer and about the portions of the first and second ferrules disposed therein. The non-physical contact visual fault locator coupler also includes a third ferrule disposed partially within the light source side of the bore of the ferrule holder. The light source side of the ferrule holder is configured to selectively engage and retain one or more of a jumper and a port of a visual fault locator. The non-physical contact visual fault locator coupler may further include a bayonet disposed about the alignment sleeve retainer and the ferrule holder. The air gap provides varying separation distances at various points dependent upon the angle of the APC ferrule.

In a further embodiment, the present invention provides method for coupling a light source to a fiber optic connector including any type of ferrule under visual fault test or the like, including: mating the fiber optic connector including the ferrule with a coupler including a ferrule and a connector stop; wherein the connector stop of the coupler is configured to prevent an endface of the ferrule of the fiber optic connector from making physical contact with an endface of the ferrule of the coupler, while allowing the endface of the ferrule of the fiber optic connector to be optically coupled with the endface of the ferrule of the coupler. Preferably, the connector stop comprises a shoulder structure manufactured into the outside surface of the coupler. Optionally, the connector stop comprises a collar disposed wholly or partially within an inside portion of the coupler. Another method of the present invention provides coupling a light source to a fiber optic connector including an APC ferrule under visual fault test or the like, including: mating the fiber optic connector including the APC ferrule with a coupler including a flat ferrule, such that an air gap is generated at the mating interface as a portion of the APC ferrule contacts the flat ferrule endface.

DETAILED DESCRIPTION OF THE PREFERRED EMBODIMENTS

Reference is now made to preferred embodiments of the present invention, examples of which are illustrated in the accompanying drawings. Whenever possible, like reference numbers are used to refer to the same or like components/parts. It should be noted that the features of the non-PC VFL coupler disclosed could be applied equally to the receptacle or plug portion of a receptacle and plug assembly. Thus, the generic term "connector" is used herein. Although specific connector types and ferrule sizes are described herein, it is contemplated that any type, number and ferrule size may be used in the present invention.

Figure 1:
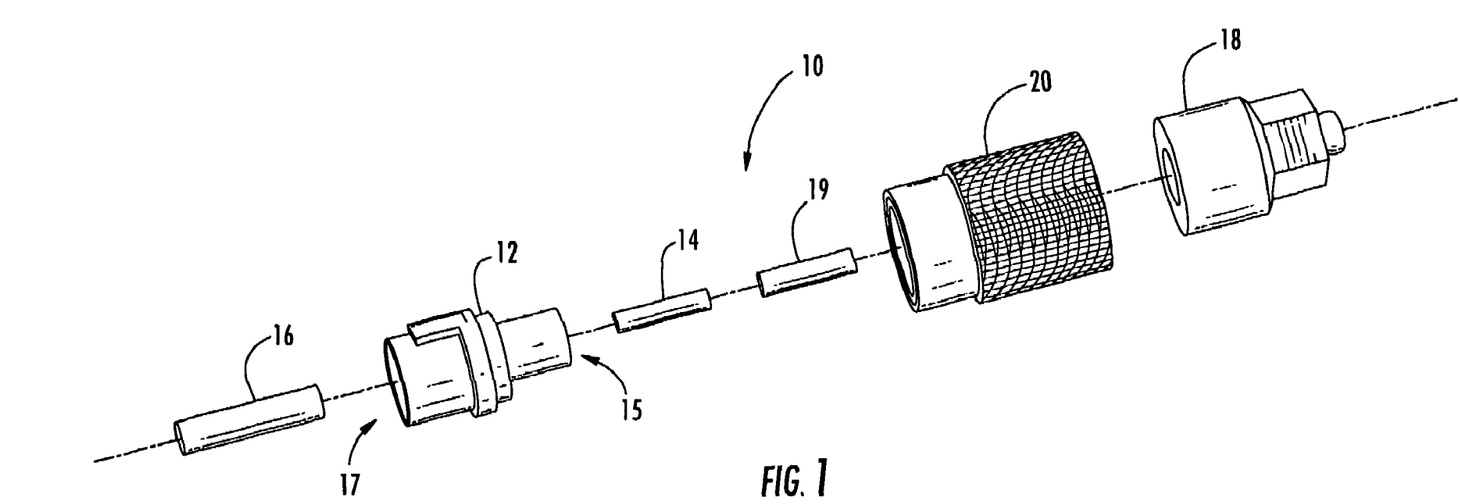
FIG. 1 is a perspective view of one embodiment of the non-PC VFL coupler of the present invention, specifically a 1.25 mm version.
Figure 2:
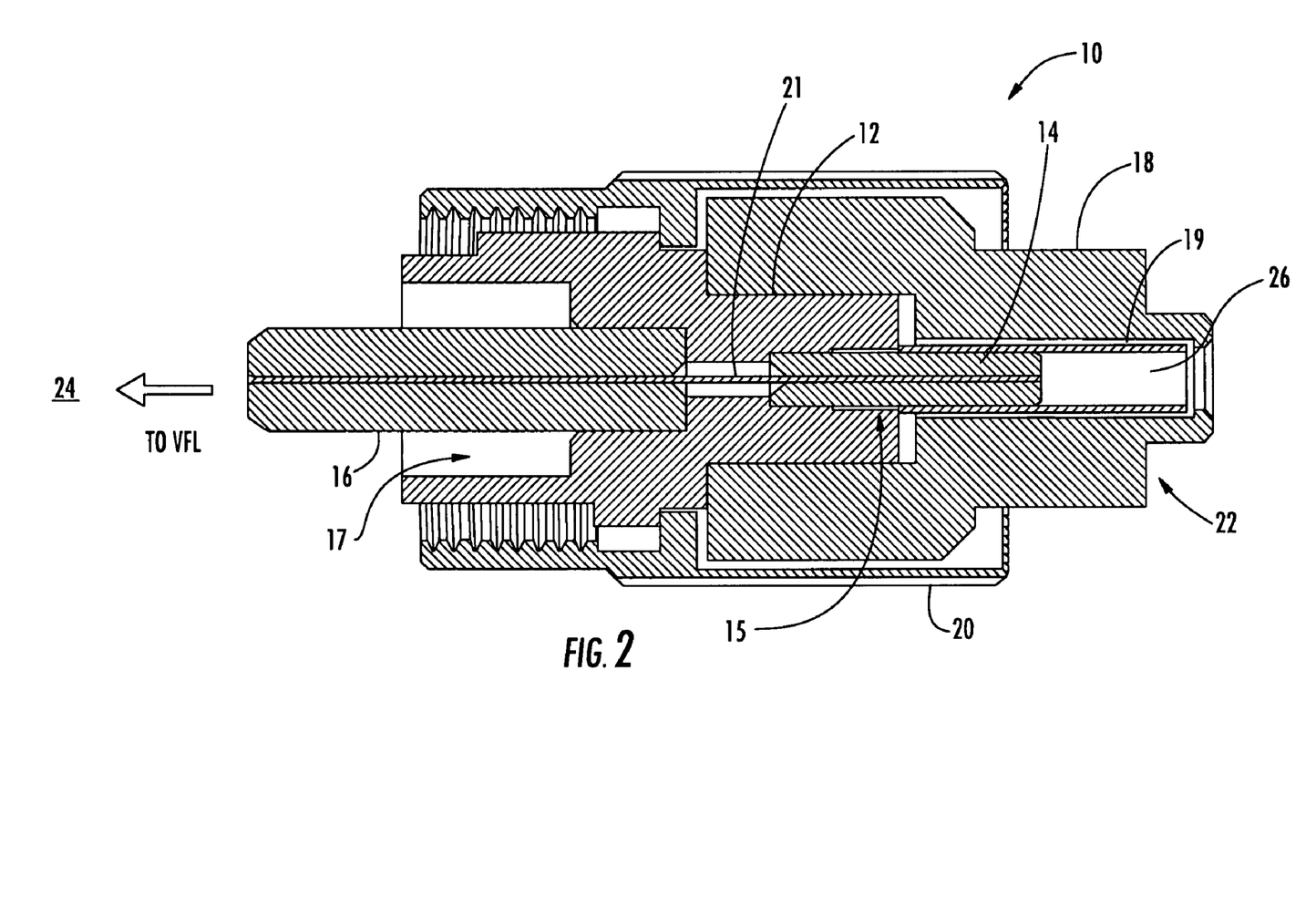
FIG. 2 is a cross-sectional view of the non-PC VFL coupler of FIG. 1.

FIGS. 1 and 2 illustrate one embodiment of the non-PC VFL coupler 10 of the present invention, specifically a 1.25 mm version. The non-PC VFL coupler 10 includes a substantially-cylindrical or annular ferrule holder 12 that is configured to engage and retain a 1.25 mm ferrule 14 on one end 15 and a larger 2.5 mm ferrule 16 on the other end 17. The first ferrule 14 is disposed partially within a corresponding opening formed by the first end 15 of the ferrule holder 12 and the second ferrule 16 is disposed partially within a corresponding opening formed by the second end 17 of the ferrule holder 12. The ferrule holder 12 may be manufactured from a substantially-rigid material, such as a plastic, metal or ceramic material. Optionally, the second end 17 of the ferrule holder 12 is keyed, such that it engages a VFL port or the like, as described in greater detail below. In alternative embodiments, the alignment member may also be keyed.

A substantially-cylindrical or annular alignment sleeve retainer 18, also referred to herein as an "alignment member", is configured to engage and retain the first end 15 of the ferrule holder 12, as well as a ferrule alignment sleeve 19 disposed within a bore 26 formed therethrough. It should be noted that this ferrule alignment sleeve 19 is optional, and the alignment sleeve retainer 18 may alternatively be manufactured with a precision bore to provide adequate ferrule alignment. The first ferrule 14 is disposed partially within the ferrule alignment sleeve 19. The alignment sleeve retainer 18 is manufactured from a substantially-rigid material, such as a plastic or metal material. A bayonet 20 is selectively disposed about the alignment sleeve retainer 18, the ferrule holder 12, and the other components of the non-PC VFL coupler 10. Preferably, the bayonet 20 is internally threaded and engages the VFL port or the like. The ferrule holder 12 is manufactured from a substantially-rigid material, such as a plastic or metal material. Within the non-PC VFL coupler 10, an optical fiber 21 (FIG. 2) optically couples the first ferrule 14 to the second ferrule 16. In alternative embodiments, ferrules 14 and 16 may be similar.

The second end 17 of the ferrule holder 12, the second ferrule 16, and the bayonet 20 are collectively configured to engage and optically mate with a VFL port 24 of a CTS system (not illustrated) or the like, either directly or through a jumper (not illustrated) or the like. Likewise, referring to FIG. 3, the alignment sleeve retainer 18 is configured to engage and retain the end of a connector 30, such as a 1.25 mm ferruled connector, as in the present embodiment, a 2.5 mm ferruled connector, a multi-fiber connector, etc. The end of the connector 30 includes a 1.25 mm ferrule 32. This third ferrule 32 is disposed partially within the ferrule alignment sleeve 19 of the coupler 10 when the alignment sleeve retainer 18 and connector 30 are engaged. Advantageously, a connector stop 22 manufactured into the outside surface of the alignment sleeve retainer 18 contacts the end of the connector housing 30 and controls the depth of penetration of the third ferrule 32 into the ferrule alignment sleeve 19. Preferably, the connector stop 22 brings the endfaces of the first ferrule 14 and the third ferrule 32 into close proximity, but does not allow the endfaces to make PC. Ideally, the separation of the endfaces of the first ferrule 14 and the third ferrule 32 is on the order of micrometers (microns).

Figure 3:
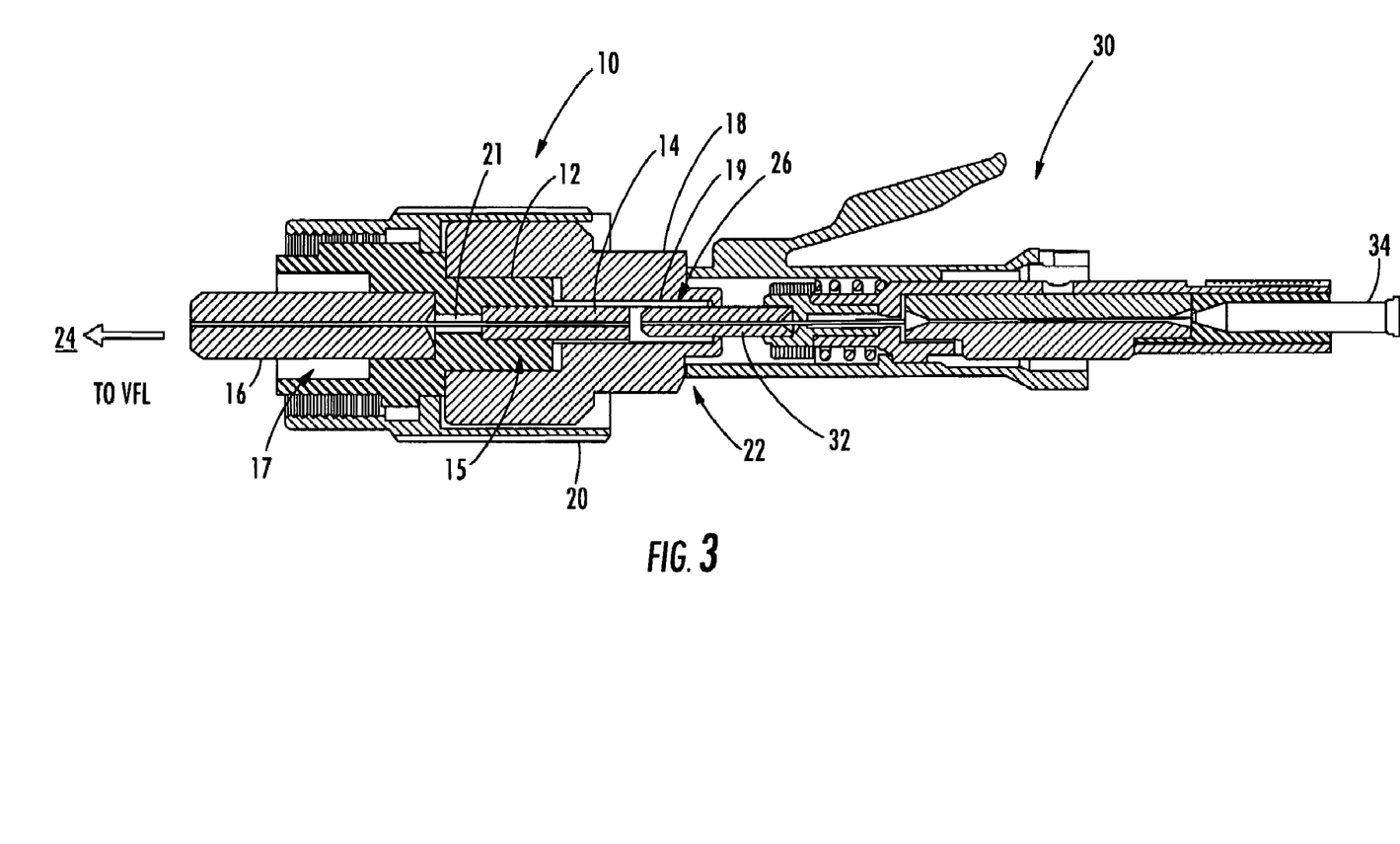
FIG. 3 is a cross-sectional view of the non-PC VFL coupler of FIG. 1 engaged with a compatible field-installable fiber optic connector, the endfaces of the ferrules of the non-PC VFL coupler and the field-installable fiber optic connector not physically contacting one another.

The connector 30 also includes a field fiber lead-in tube 34 and a plurality of other components, not directly relevant to the discussion herein. All of the components of the coupler 10 and connector 30 may be press-fit together, joined using an adhesive, integrally formed, etc.

Figure 4:
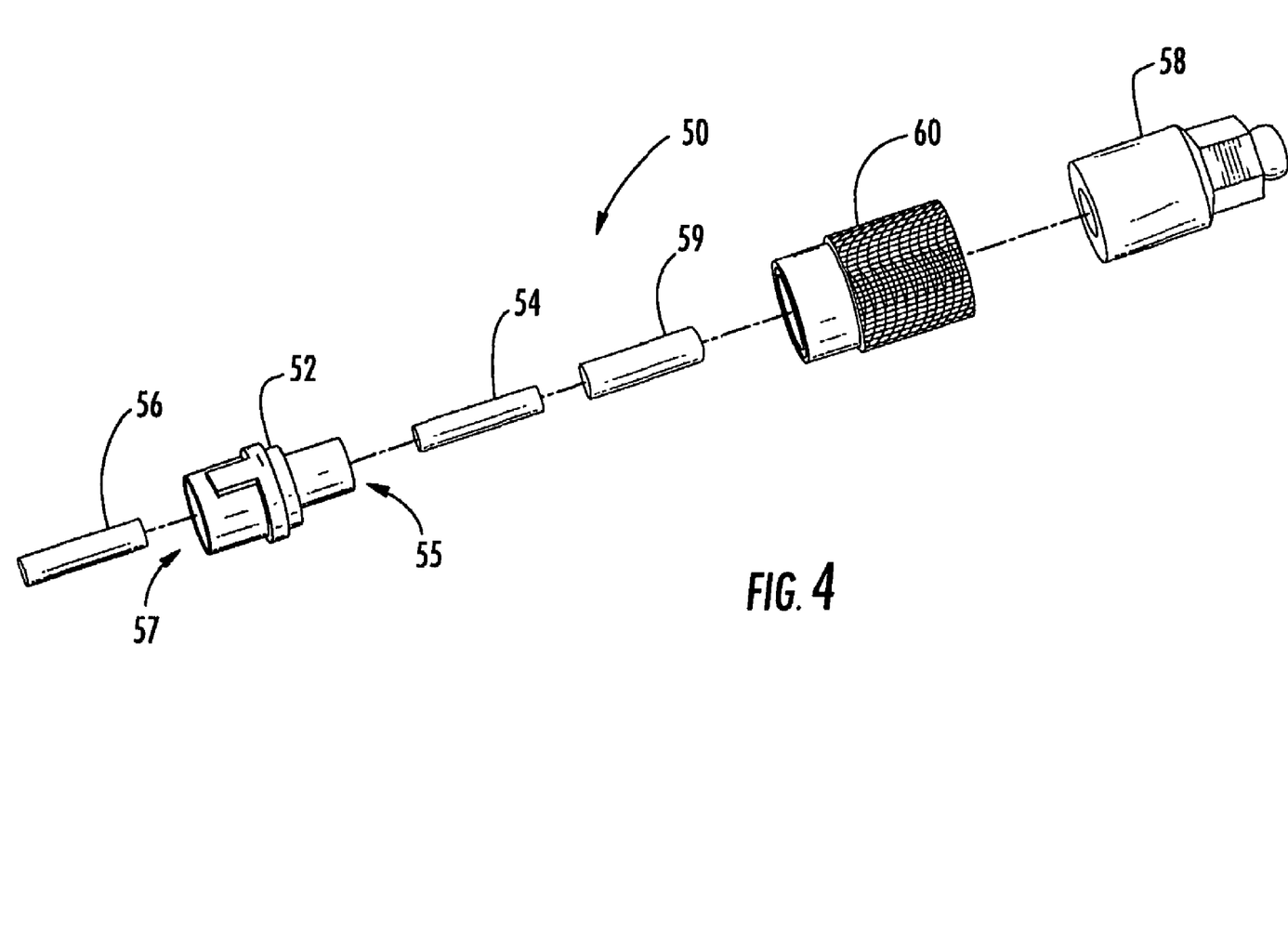
FIG. 4 is a perspective view of another embodiment of the non-PC VFL coupler of the present invention, specifically a 2.5 mm version.
Figure 5:
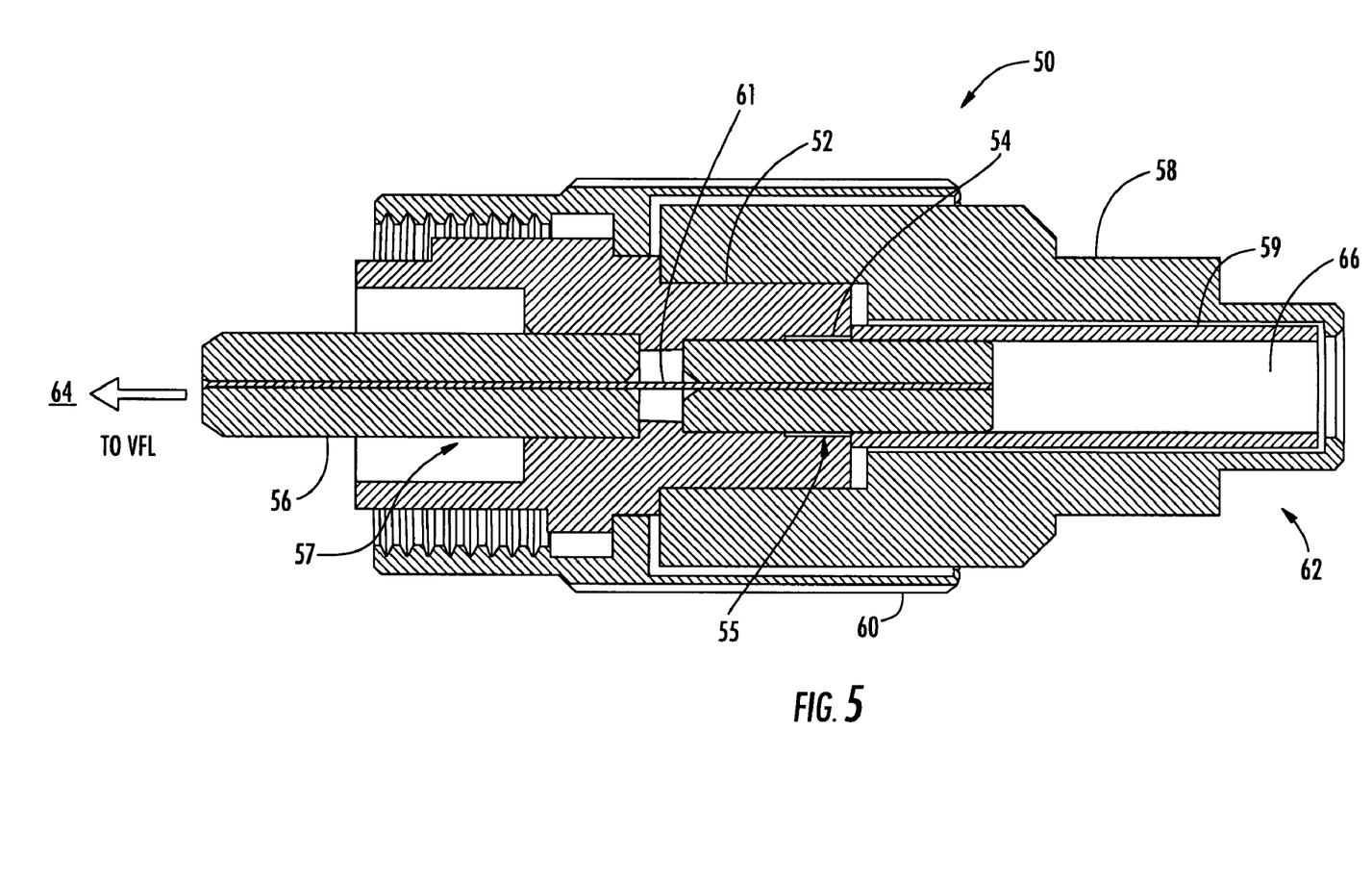
FIG. 5 is a cross-sectional view of the non-PC VFL coupler of FIG. 4.

FIGS. 4 and 5 illustrate another embodiment of the non-PC VFL coupler 50 of the present invention, specifically a 2.5 mm version. The non-PC VFL coupler 50 includes a substantially-cylindrical or annular ferrule holder 52 that is configured to engage and retain a 2.5 mm ferrule 54 on one end 55 and a 2.5 mm ferrule 56 on the other end 57. The first ferrule 54 is disposed partially within a corresponding opening formed by the first end 55 of the ferrule holder 52 and the second ferrule 56 is disposed partially within a corresponding opening formed by the second end 57 of the ferrule holder 52. The ferrule holder 52 is manufactured from a substantially-rigid material, such as a plastic or metal material. Optionally, the second end 57 of the ferrule holder 52 is keyed, such that it engages a VFL port or the like, as described in greater detail below.

A substantially-cylindrical or annular alignment sleeve retainer 58 is configured to engage and retain the first end 55 of the ferrule holder 52, as well as a ferrule alignment sleeve 59 disposed within a bore 66 formed therethrough. Again, it should be noted that this ferrule alignment sleeve 59 is optional, and the alignment sleeve retainer 58 may alternatively be manufactured with a precision bore to provide adequate ferrule alignment. The first ferrule 54 is disposed partially within the ferrule alignment sleeve 59. The alignment sleeve retainer 58 is manufactured from a substantially-rigid material, such as a plastic or metal material. A bayonet 60 is selectively disposed about the alignment sleeve retainer 58, the ferrule holder 52, and the other components of the non-PC VFL coupler 50. Preferably, the bayonet 60 is internally threaded and engages the VFL port or the like. The ferrule holder 52 is manufactured from a substantially-rigid material, such as a plastic or metal material. Within the non-PC VFL coupler 50, an optical fiber 61 (FIG. 5) optically couples the first ferrule 54 to the second ferrule 56. In alternative embodiments, ferrules 54 and 56 may be similar.

The second end 57 of the ferrule holder 52, the second ferrule 56, and the bayonet 60 are collectively configured to engage and optically mate with a VFL port 64 of a CTS system (not illustrated) or the like, either directly or through a jumper (not illustrated) or the like. Likewise, referring to FIG. 6, the alignment sleeve retainer 58 is configured to engage and retain the end of a connector 70, such as a 1.25 mm ferruled connector, a 2.5mm ferruled connector, as in the present embodiment or, a multi-fiber connector, etc. The end of the connector 70 includes a 2.5 mm ferrule 72. This third ferrule 72 is disposed partially within the ferrule alignment sleeve 59 of the coupler 50 when the alignment sleeve retainer 58 and connector 70 are engaged. Advantageously, a connector stop 62 manufactured into the outside surface of the alignment sleeve retainer 58 contacts the end of the connector 70 and controls the depth of penetration of the third ferrule 72 into the ferrule alignment sleeve 59. Preferably, the connector stop 62 brings the endfaces of the first ferrule 54 and the third ferrule 72 into close proximity, but does not allow the endfaces to make PC. Ideally, the separation of the endfaces of the first ferrule 54 and the third ferrule 72 is on the order of micrometers (microns).

Figure 6:
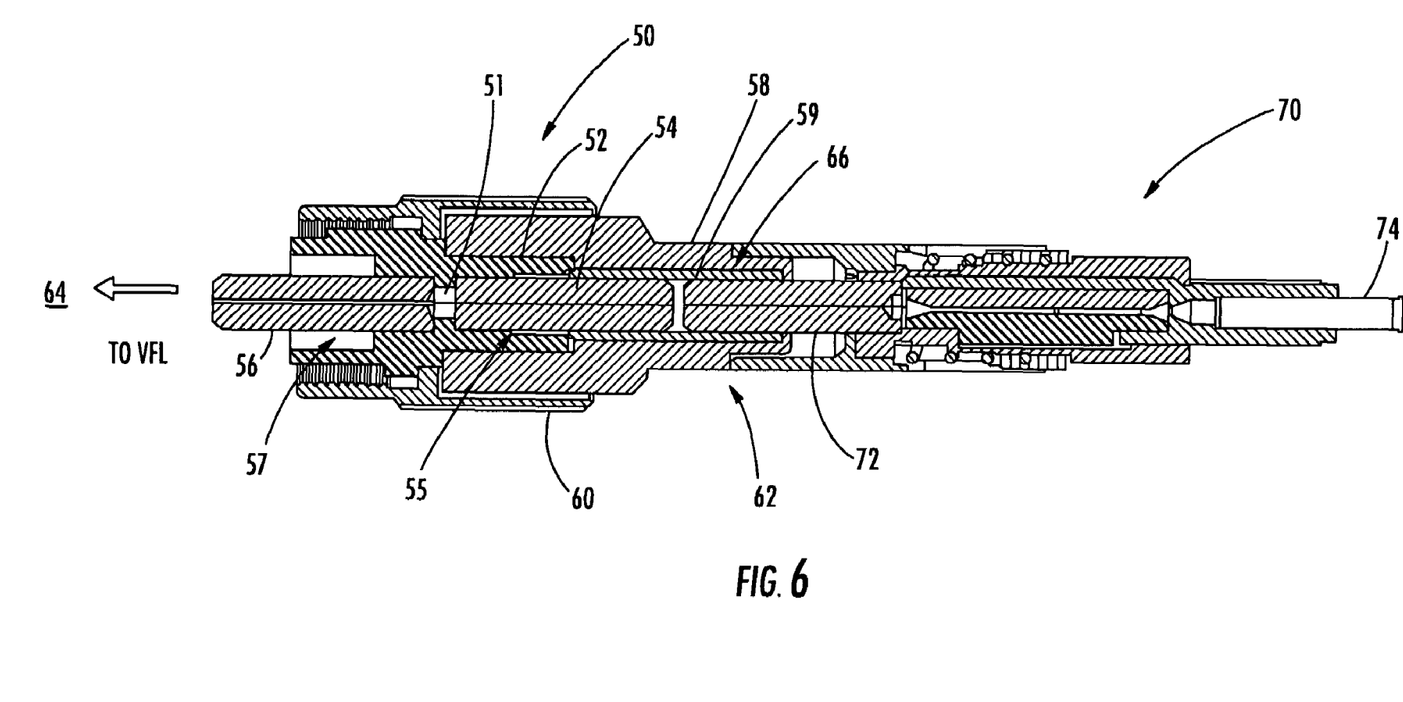
FIG. 6 is a cross-sectional view of the non-PC VFL coupler of FIG. 4 engaged with a compatible field-installable fiber optic connector, the endfaces of the ferrules of the non-PC VFL coupler and the field-installable fiber optic connector not physically contacting one another.

The connector 70 also includes a field fiber lead-in tube 74 and a plurality of other components, not directly relevant to the discussion herein. All of the components of the coupler 50 and connector 70 may be press-fit together, joined using an adhesive, integrally formed, etc.

Figure 7:
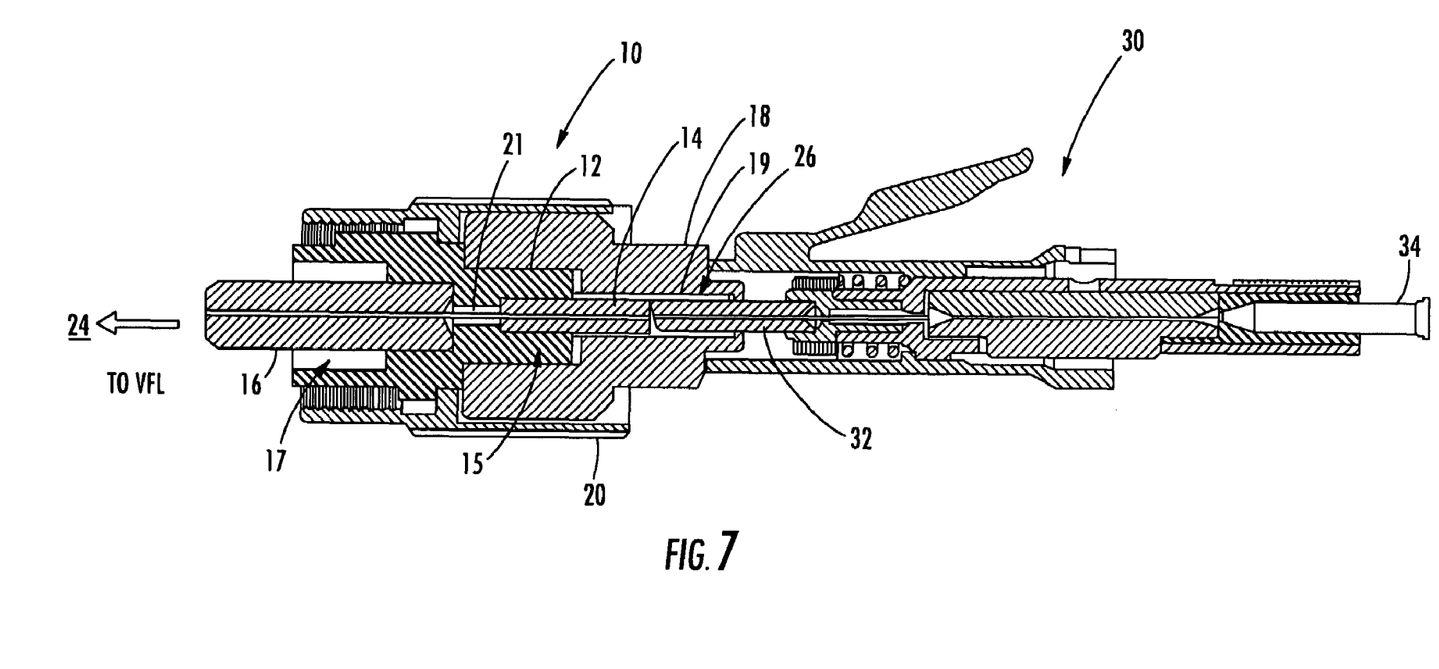
FIG. 7 is a cross-sectional view of a non-PC VFL coupler engaged with a compatible field-installable fiber optic connector including a 1.25 mm APC ferrule, the endface portions about the optical fiber of the flat ferrule of the non-PC VFL coupler and the APC ferrule not physically contacting one another.

FIG. 7 illustrates another embodiment of the non-PC VFL coupler 10 of the present invention, specifically a 1.25 mm version. The non-PC VFL coupler 10 includes a substantially-cylindrical or annular ferrule holder 12 that is configured to engage and retain a 1.25 mm flat ferrule 14 on one end 15, and a larger 2.5 mm ferrule 16 on the other end 17. The flat ferrule 14 is disposed partially within a corresponding opening formed by the first end 15 of the ferrule holder 12 and the second ferrule 16 is disposed partially within a corresponding opening formed by the second end 17 of the ferrule holder 12. The ferrule holder 12 is manufactured from a substantially-rigid material, such as a plastic, metal or ceramic material. Optionally, the second end 17 of the ferrule holder 12 is keyed, such that it engages a VFL port or the like, as described in greater detail below.

A substantially-cylindrical or annular alignment sleeve retainer 18 is configured to engage and retain the first end 15 of the ferrule holder 12, as well as a ferrule alignment sleeve 19 disposed within a bore 26 formed therethrough. It should be noted that this ferrule alignment sleeve 19 is optional, and the alignment sleeve retainer 18 may alternatively be manufactured with a precision bore to provide adequate ferrule alignment. The flat ferrule 14 is disposed partially within the ferrule alignment sleeve 19. A bayonet 20 is selectively disposed about the alignment sleeve retainer 18, the ferrule holder 12, and the other components of the non-PC VFL coupler 10. Preferably, the bayonet 20 is internally threaded and engages the VFL port or the like. Within the non-PC VFL coupler 10, an optical fiber 21 optically couples the first ferrule 14 to the second ferrule 16.

The second end 17 of the ferrule holder 12, the second ferrule 16, and the bayonet 20 are collectively configured to engage and optically mate with a VFL port 24 of a CTS system (not illustrated) or the like, either directly or through a jumper (not illustrated) or the like. The alignment sleeve retainer 18 is configured to engage and retain the end of a connector 30, such as a 1.25 mm APC ferruled connector, as in the present embodiment, a 2.5 mm APC ferruled connector, a multi-fiber APC connector, etc. The end of the connector 30 includes an APC ferrule 32. This third ferrule 32 is disposed partially within the ferrule alignment sleeve 19 of the coupler 10 when the alignment sleeve retainer 18 and connector 30 are engaged. A portion of the APC ferrule endface contacts a portion of the flat ferrule endface and generates an air gap therebetween such that the endface portions of the ferrules about the optical fiber bore are not in physical contact, thus preventing endface wear and degradation. The air gap is shown exaggerated for clarity. In other words, the physical stop is provided by mating a flat ferrule and an APC ferrule. The resulting air gap at the ferrule-to-ferrule interface is accounted for by the operator or VFL during a continuity test. Preferably, the angle of the APC ferrule endface brings the endfaces of the first ferrule 14 and the third ferrule 32 into close proximity, but does not allow the fiber presenting portions to make PC. Ideally, the separation of the endfaces of the first ferrule 14 and the third ferrule 32 is on the order of micrometers (microns), and varies along the air gap length. In alternative embodiments, the coupler ferrule may be an APC ferrule and the connector ferrule under test a flat ferrule, still producing an air gap therebetween. In another alternative embodiment, the coupler ferrule and the connector ferrule that optically mates with the coupler ferrule may both be APC type ferrule having non-complimentary angles or oriented such that an air gap is formed therebetween.

Figure 8:
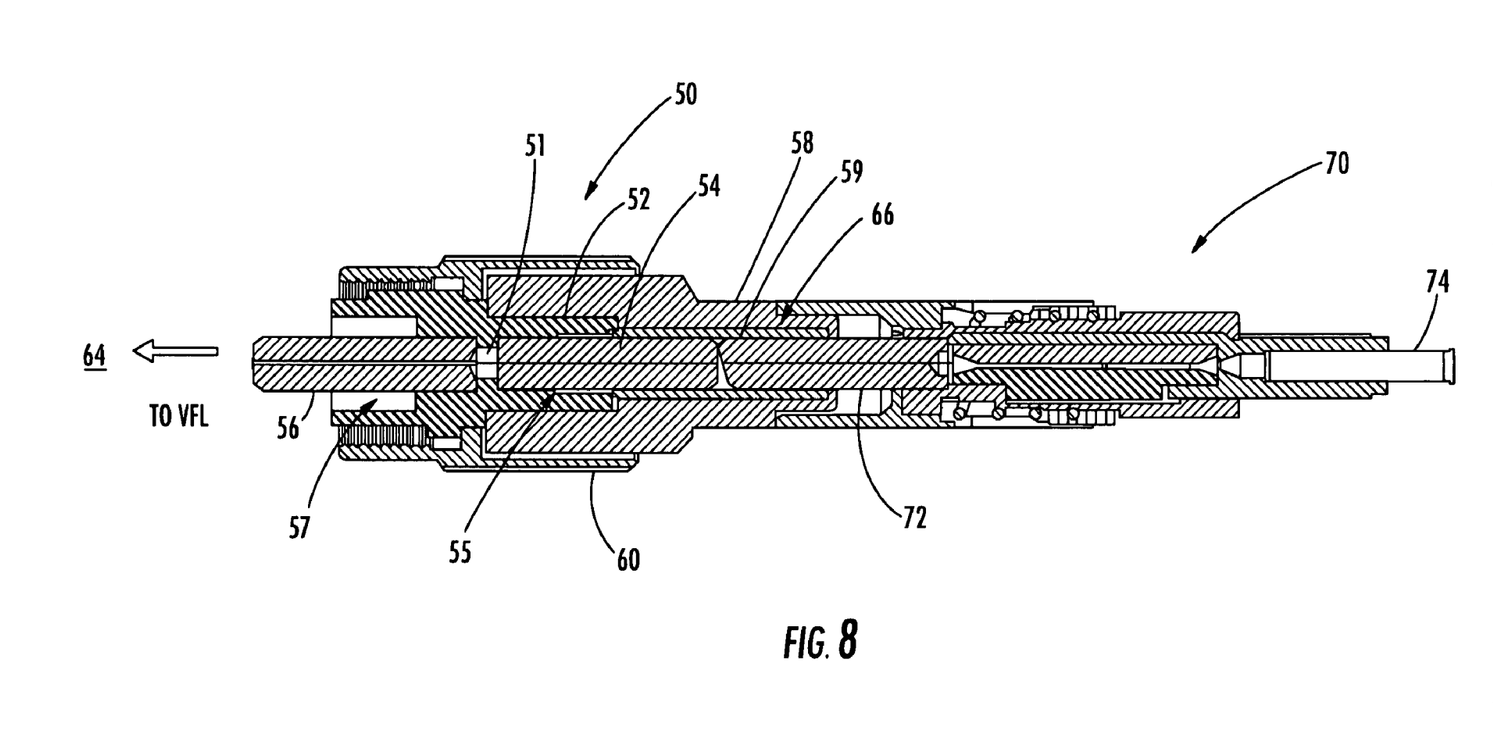
FIG. 8 is a cross-sectional view of a non-PC VFL coupler engaged with a compatible field-installable fiber optic connector including a 2.5 mm APC ferrule, the endface portions about the optical fiber of the flat ferrule of the non-PC VFL coupler and the APC ferrule not physically contacting one another.

FIG. 8 illustrates another embodiment of the non-PC VFL coupler 50 of the present invention, specifically a 2.5 mm version. The non-PC VFL coupler 50 includes a substantially-cylindrical or annular ferrule holder 52 that is configured to engage and retain a 2.5 mm ferrule 54 on one end 55 and a 2.5 mm ferrule 56 on the other end 57. The first ferrule 54 is disposed partially within a corresponding opening formed by the first end 55 of the ferrule holder 52 and the second ferrule 56 is disposed partially within a corresponding opening formed by the second end 57 of the ferrule holder 52. Optionally, the second end 57 of the ferrule holder 52 is keyed, such that it engages a VFL port or the like, as described in greater detail below.

A substantially-cylindrical or annular alignment sleeve retainer 58 is configured to engage and retain the first end 55 of the ferrule holder 52, as well as a ferrule alignment sleeve 59 disposed within a bore 66 formed therethrough. Again, it should be noted that this ferrule alignment sleeve 59 is optional, and the alignment sleeve retainer 58 may alternatively be manufactured with a precision bore to provide adequate ferrule alignment. The first ferrule 54 is disposed partially within the ferrule alignment sleeve 59. A bayonet 60 is selectively disposed about the alignment sleeve retainer 58, the ferrule holder 52, and the other components of the non-PC VFL coupler 50. Preferably, the bayonet 60 is internally threaded and engages the VFL port or the like. Within the non-PC VFL coupler 50, an optical fiber 61 optically couples the first ferrule 54 to the second ferrule 56.

The second end 57 of the ferrule holder 52, the second ferrule 56, and the bayonet 60 are collectively configured to engage and optically mate with a VFL port 64 of a CTS system (not illustrated) or the like, either directly or through a jumper (not illustrated) or the like. Likewise, the alignment sleeve retainer 58 is configured to engage and retain the end of a connector 70, such as a 1.25 mm APC ferruled connector, a 2.5 mm APC ferruled connector, as in the present embodiment or, a multi-fiber APC connector, etc. The end of the connector 70 includes a 2.5 mm APC ferrule 72. This third ferrule 72 is disposed partially within the ferrule alignment sleeve 59 of the coupler 50 when the alignment sleeve retainer 58 and connector 70 are engaged. A portion of the APC ferrule endface contacts a portion of the flat ferrule endface and generates an air gap therebetween such that the endface portions of the ferrules about the optical fiber bore are not in physical contact, thus preventing endface wear and degradation. The air gap is shown exaggerated for clarity. In other words, the physical stop is provided by mating a flat ferrule and an APC ferrule. The resulting air gap at the ferrule-to-ferrule interface is accounted for by the operator or VFL during a continuity test. Preferably, the angle of the APC ferrule endface brings the endfaces of the first ferrule 54 and the third ferrule 72 into close proximity, but does not allow the fiber presenting portions to make PC. Ideally, the separation of the endfaces of the first ferrule 54 and the third ferrule 72 is on the order of micrometers (microns). In alternative embodiments, the coupler ferrule may be an APC ferrule and the connector ferrule under test a flat ferrule, still producing an air gap therebetween.

Although the non-PC VFL coupler of the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A coupler for coupling light energy from a light source to a connector ferrule under test without physical contact of endfaces of the connector ferrule and a ferrule of the coupler, comprising:

a ferrule holder defining a bore therethrough and defining a first end for receiving a portion of a first ferrule and a second end for receiving a portion of a second ferrule therein, wherein an optical fiber of the coupler is attached to both the first ferrule and the second ferrule;

an alignment member engaged with the ferrule holder and defining a passage therethrough and defining a first end for receiving a portion of the first ferrule and a second end for receiving a portion of the connector ferrule therein for alignment;

a stop for preventing at least a portion of each of the endfaces of the connector ferrule and the first ferrule and at least one optical fiber of each of the connector ferrule and the first ferrule from coming into physical contact, and an air gap formed between at least a portion of the endfaces of the first ferrule and the connector ferrule.

2. The coupler according to claim 1, wherein the stop comprises a physical stop between the alignment member and a connector housing.

3. The coupler according to claim 1, wherein one of the first ferrule and the connector ferrule is an angled physical contact ferrule and the other is a flat faced ferrule.

4. The coupler according to claim 3, wherein the stop comprises contact between a portion of the angled physical contact ferrule and a portion of the flat faced ferrule.

5. The coupler according to claim 1, wherein at least one of the first ferrule and the connector ferrule is an angled physical contact ferrule or a flat faced ferrule.

6. The coupler according to claim 1, further comprising an alignment sleeve disposed at least partially within the passage of the alignment member.

7. The coupler according to claim 1, wherein at least one of the alignment member and the ferrule holder are keyed.

8. The coupler according to claim 1, wherein the ferrule holder is configured to selectively engage and retain a jumper of a visual fault locator.

9. The coupler according to claim 1, wherein the stop is configured to prevent the endface of the connector ferrule from making physical contact with the endface of the first ferrule and to maintain a separation distance of between about 1 micron and about 500 micron.

10. A non-physical contact visual fault locator coupler for coupling a light source to a fiber optic connector under test without physical contact of fibers of associated ferrules, comprising:
   an alignment member defining a passage therethrough, a light source side, and a fiber optic connector side;
   a coupler ferrule partially received within the light source side;
   a ferrule holder engaged with the alignment member and defining a bore therethrough, a light source side, and a fiber optic connector side, the fiber optic connector side of the ferrule holder configured to engage the light source side of the alignment member, a second ferrule disposed partially within the light source side of the bore of the ferrule holder and the coupler ferrule disposed partially within the fiber optic connector side of the bore of the ferrule holder, wherein an optical fiber of the coupler is attached to both the coupler ferrule and the second ferrule;
   wherein the fiber optic connector side of the alignment member is configured to receive a connector ferrule;
   wherein the coupler is configured to prevent physical contact between at least one fiber of the connector ferrule and the coupler ferrule; and
   wherein an air gap is present between at least a portion of the endfaces of the connector ferrule and the coupler ferrule.

11. The coupler according to claim 10, wherein the connector ferrule is a angled physical contact ferrule.

12. The coupler according to claim 10, wherein the coupler ferrule is a flat faced ferrule.

13. The coupler according to claim 10, wherein the alignment member further comprises a stop for interfering with a connector housing to prevent coupler ferrule and connector ferrule physical contact.

14. The coupler according to claim 10, further comprising an alignment sleeve disposed at least partially within the passage of the alignment member.

15. The coupler according to claim 10, further comprising a ferrule optically connected to a jumper of a visual fault locator.

16. The coupler according to claim 10, wherein at least one of the alignment member and the ferrule holder are keyed.

17. The coupler according to claim 10, wherein the air gap is about 1 micron to about 500 micron.

18. A method for coupling light energy from a visual fault locator to a connector ferrule under test thru a coupler without physical contact of fibers of a connector ferrule and a coupler ferrule, comprising:
   mating a fiber optic connector comprising the connector ferrule with the coupler comprising a coupler ferrule, a second ferrule and a connector stop and an optical fiber of the coupler that is attached to both the coupler ferrule and the second ferrule;
   wherein the connector stop of the coupler is configured to prevent an endface of the connector ferrule from making physical contact with an endface of the coupler ferrule, while allowing the fiber of the connector ferrule to be optically coupled with the fiber of the coupler ferrule.

19. A coupler for coupling light energy from a light source to a connector ferrule under test without physical contact of endfaces of the connector ferrule and a ferrule of the coupler, comprising:
   a ferrule holder defining a bore therethrough and defining a first end for receiving a portion of a first ferrule and a second end for receiving a portion of a second ferrule therein;
   an alignment member engaged with the ferrule holder and defining a passage therethrough and defining a first end for receiving a portion of the first ferrule and a second end for receiving a portion of the connector ferrule therein for alignment, wherein one of the first ferrule and the connector ferrule is an angled physical contact ferrule and the other is a flat faced ferrule;
   a stop for preventing at least a portion of each of the endfaces of the connector ferrule and the first ferrule and at least one optical fiber of each of the connector ferrule and the first ferrule from coming into physical contact wherein the stop comprises contact between a portion of the angled physical contact ferrule and a portion of the flat faced ferrule, and
   an air gap formed between at least a portion of the endfaces of the first ferrule and the connector ferrule.

* * * * *